(12) United States Patent
Chen et al.

(10) Patent No.: US 9,662,623 B2
(45) Date of Patent: May 30, 2017

(54) SYSTEM AND METHOD FOR HYDROTHERMAL REACTION

(75) Inventors: Dezhen Chen, Shanghai (CN); Xiaobo Ma, Shanghai (CN); Lijie Yin, Shanghai (CN); Lin Qiu, Shanghai (CN)

(73) Assignee: Tongji University (CN)

( * ) Notice: Subject to any disclaimer, the term of this patent is extended or adjusted under 35 U.S.C. 154(b) by 74 days.

(21) Appl. No.: 14/377,828

(22) PCT Filed: Feb. 9, 2012

(86) PCT No.: PCT/CN2012/070981
§ 371 (c)(1),
(2), (4) Date: Aug. 8, 2014

(87) PCT Pub. No.: WO2013/117000
PCT Pub. Date: Aug. 15, 2013

(65) Prior Publication Data
US 2014/0364676 A1    Dec. 11, 2014

(51) Int. Cl.
*B01J 6/00*      (2006.01)
*B01J 8/00*      (2006.01)
(Continued)

(52) U.S. Cl.
CPC ............ *B01J 8/00* (2013.01); *B01J 3/008* (2013.01); *B01J 3/04* (2013.01); *B01J 6/00* (2013.01);
(Continued)

(58) Field of Classification Search
CPC ......... B01J 3/00; B01J 3/04; B01J 6/00; B01J 8/00; B01J 19/00; B01J 19/0006;
(Continued)

(56) References Cited

U.S. PATENT DOCUMENTS 5,843,386 A * 12/1998 Makino ..................... B01J 3/04
                                                    210/177
6,464,861 B1    10/2002 Kobayashi et al.
(Continued)

FOREIGN PATENT DOCUMENTS

CN        1446621 A      10/2003
CN        1683091 A      10/2005
(Continued)

OTHER PUBLICATIONS

Machine translation of DE 102010000578 A1, published Sep. 1, 2011.*
(Continued)

*Primary Examiner* — Natasha Young
(74) *Attorney, Agent, or Firm* — Blank Rome LLP

(57) ABSTRACT

A system for hydrothermal reaction comprises a heater (3) including a circulating component for fluid flowing across and a heat source for heating fluid, and a reactor (4, 5) including a heat preserving container in communication with the circulating component via pipes. A method for hydrothermal reaction comprises heating the fluid including the reactant and water for hydrothermal reaction, and feeding the heated fluid to the heat preserving container to perform the hydrothermal reaction.

18 Claims, 5 Drawing Sheets

(51) Int. Cl.
- *B01J 19/00* (2006.01)
- *B01J 19/02* (2006.01)
- *B01J 19/24* (2006.01)
- *C10G 1/00* (2006.01)
- *C10G 1/06* (2006.01)
- *B09B 3/00* (2006.01)
- *C10L 9/00* (2006.01)
- *C10L 9/08* (2006.01)
- *B01J 3/00* (2006.01)
- *B01J 3/04* (2006.01)

(52) U.S. Cl.
CPC ........... *B01J 19/0013* (2013.01); *B01J 19/02* (2013.01); *B01J 19/2445* (2013.01); *B09B 3/0083* (2013.01); *C10G 1/008* (2013.01); *C10G 1/065* (2013.01); *C10L 9/086* (2013.01); *B01J 2219/0009* (2013.01); *B01J 2219/0011* (2013.01); *B01J 2219/00063* (2013.01); *B01J 2219/00065* (2013.01); *B01J 2219/00092* (2013.01); *B01J 2219/00105* (2013.01); *B01J 2219/00114* (2013.01); *B01J 2219/0286* (2013.01)

(58) Field of Classification Search
CPC ........ B01J 19/0013; B01J 19/02; B01J 19/24; B01J 19/2445; B01J 2219/00049–2219/00058; B01J 2219/00063; B01J 2219/00065; B01J 2219/00074; B01J 2219/00076; B01J 2219/00087; B01J 2219/0009; B01J 2219/00092; B01J 2219/00105; B01J 2219/0011; B01J 2219/00114; B01J 2219/02; B01J 2219/025; B01J 2219/0277; B01J 2219/0286; C10G 1/00; C10G 1/008; C10G 1/06; C10G 1/065; B09B 3/00; B09B 3/0083; C10L 9/00; C10L 9/08; C10L 9/086

See application file for complete search history.

(56) References Cited

U.S. PATENT DOCUMENTS

| | | |
|---|---|---|
| 9,029,623 B2 | 5/2015 | Chen et al. |
| 2009/0283397 A1 | 11/2009 | Kato et al. |
| 2010/0101142 A1 | 4/2010 | Eisner et al. |
| 2014/0051902 A1 | 2/2014 | Chen et al. |

FOREIGN PATENT DOCUMENTS

| | | | |
|---|---|---|---|
| CN | 101050862 A | 10/2007 | |
| CN | 101134159 A | 3/2008 | |
| CN | 101448581 A | 6/2009 | |
| CN | 101688139 A | 3/2010 | |
| CN | 101805629 A | 8/2010 | |
| CN | 101851688 A | 10/2010 | |
| CN | 10293913 A | 6/2011 | |
| CN | 102108002 | 6/2011 | |
| DE | 102010000578 A1 * | 9/2011 | ............ C10L 5/447 |
| WO | WO 2008/120662 A1 * | 10/2008 | |
| WO | WO 2010/070195 A2 * | 6/2010 | |
| WO | WO 2012/145930 A1 | 11/2012 | |

OTHER PUBLICATIONS

Machine translation of WO 2008/120662 A1, published Oct. 9, 2008.*

Machine translation of CN 1446621 A, submitted with IDS filed Oct. 11, 2016 and published Oct. 8, 2003.*

* cited by examiner

SYSTEM AND METHOD FOR HYDROTHERMAL REACTION

CROSS-REFERENCE TO RELATED APPLICATION

This application is a national stage application of International Application No. PCT/CN2012/70982, now WO 2013/11700, filed on Feb. 9, 2012, the disclosure of which are fully incorporated herein by reference.

FIELD OF THE INVENTION

The present invention belongs to the field of hazard-free treatment and recycling treatment of solid waste. Specifically, the present invention relates to a system for hydrothermal reaction, and particularly relates to hydrothermal reaction for hazard-free treatment and recycling treatment of solid waste such as incineration fly ash, sludge, biomass waste, etc., and especially to continuous and semi-continuous hydrothermal reaction. The present invention also relates to the method for the hydrothermal reaction.

DESCRIPTION OF THE PRIOR ART

Hydrothermal reactions are the reaction of a reactant under a certain temperature and pressure after being mixed with water, which is an important reaction pattern of processing pollutants and stabilizing and recycling of the biomass waste, which finds increasingly wider application for its reaction efficiency and capability of avoiding secondary pollution. For example, the incineration of fly ash, the elimination of the persistent organic pollutant (referred to as POPs) in the particulate matters of polluted solid, etc. and the separation or stabilization of heavy metal, the hydrothermal drying and hydrothermal regulation of sludge, the hydrothermal stabilization of the biomass organic waste, and the pyrohydrolysis reaction of organics are all hydrothermal reactions under high temperature and high pressure. However, the hydrothermal reaction generally needs a certain standing time to ensure complete reaction, so the present hydrothermal reaction are mostly completed in batches in pressure containers. Although the present technology adopts a plurality of parallel pressure container reactors to realize continuity or semi-continuity of the hydrothermal reaction, the container as the reactor is also a heater at the same time, which makes the reaction system unsafe.

The newly developed methods of eliminating the persistent organic pollutant in the particulate matters are supercritical fluid extraction (SCFE), supercritical water oxidation (SCWO), hydrothermal treatment, etc. For example, the Patent ZL200510075433.4 disclosed a supercritical water oxidation method, which is effective for processing toxic organic waste fluidolution. In the supercritical reaction condition (Tc,≥373.95° C., $P_C$≥220.64 bar), the organics, oxygen and water form a single homogeneous phase, for a quick oxidizing reaction, so as to effectively destroy the organics such as PCDD/Fs. The Chinese Patent 200710040771.3 disclosed a hydrothermal processing method of incineration fly ash, generating hydrogenation by decomposing the hydrazine and performing the hydrogenation and dehalogenation to the dioxin-like pollutants; the Patent Application PCT/CN2011/073562 disclosed a treatment method of persistent organic pollutant in particulates that adds both $Fe^{2+}$ and $Fe^{3+}$ salt in the particulate matters/water mixture to form $Fe_xO_y$, under the condition of hydrothermal reaction. However, when the present technology is applied in the engineering design and operations, the present implementation apparatus, i.e. the large-scale tank batch reactor, needs to perform both heating and heat preserving to the material, which leads to high cost and maintenance difficulties.

Performing hydrothermal reaction to biomass material can produce hydrogen, bio-oil and stabilize the biomass organic waste, for example the application/patent NO. 200680054674 disclosed a processing system for organic waste, wherein the batch reactor is used; the patent application 200910265487.5 disclosed a horizontal reaction kettle for sludge hydrothermal reaction; the patent application 200780052294.0 disclosed a wet-chemical transformation of biomass by hydrothermal carbonization; the patent application 201010128949.1 disclosed a method for producing fuel oil by biomass hydrothermal liquefaction. The reactor systems realizing the aforementioned technology are all hydrothermal reaction systems. However, the reactor is integrated with both heating and reacting, thus leading to the defects in being large-scale and safety, for example: the requirement of the manufacturing material is high, and on the one hand, the large-scale high pressure tank, i.e. the reactor, itself as a heating surface is unsafe; on the other hand, the heating area is limited, and the slow heating rate affects the reaction velocity, reducing the efficiency of the system. Besides, the hydrothermal process of the particulate matter flow needs continuous stirring to keep the particulate matters uniformly distributed in the liquid phase. The magnetic stirring is commonly used in the present large-scale high pressure tank, when the temperature is increasing, the cooling system is needed for preventing magnetism loss, such that the system is complicated.

In light of the present hydrothermal reaction system being not capable of meeting the demand of safety, efficiency and large-scale processing, the present invention provides a safe, reliable hydrothermal reaction system and method for realizing the hydrothermal process of the fluid that contains the particulate matters, in order to economically safely and efficiently utilize the hydrothermal reaction to continuously or semi-continuously, in large scale, process the polluted particulate matters or stabilize and recycle the biomass waste.

SUMMARY OF THE INVENTION

The purpose of the present invention is to provide a system for hydrothermal reaction, the system comprises:
a heater including a circulating component for the fluid flowing across and a heat source for heating the fluid; and
a reactor including a container for heat preserving; the container communicates with the circulating component via pipes.

Another purpose of the present invention is to provide a method for hydrothermal reaction, the method comprises: heating the fluid that includes reactant and water for hydrothermal reaction; and transporting the heated fluid to the heat preserving container to perform hydrothermal reaction.

This fluid can have reactant and water for the hydrothermal reaction, for example, the hydrothermal reaction system that includes particulate matters such as incineration fly ash or polluted solid. In the system and method provided by the present invention, the fluid is preferably paste mixture of particulate matters mixed with water, and the treatment agent; in which the particulate matter is preferably powder, slurry state particulate matters and biomass fragment, and the size of the particulate matters is less than 30 mm. The liquid-solid mass ratio is preferably from 1.8:1 to 10:1, more preferably from 2.8:1 to 4.4:1.

By adopting the system or method for the hydrothermal reaction in the present invention, the heating and reaction procedures can be separated in the hydrothermal reaction, because heating the container, i.e. the reactor itself is not required, which thus avoids the safety problems brought by the reactor heating and reduces the manufacture cost of the reactor.

In the system provided by the present invention, the heater includes the circulating component for fluid flowing across, and the heat source for heating the fluid. The fluid is heated by the heat source when flowing across the circulating component of the heater, and then it is transported to the reactor to perform hydrothermal reaction. That is to say, the main function of the heater is to make the fluid be heated up to the temperature required by the hydrothermal reaction. Here, the circulating component can be any component that has a structure to contain a certain amount of fluid including a pipe, a cavity, a chamber, etc. For example, a tubular heater, a coil heater, a serpentuator heater, a sheath tube heater, a spiral plate heater, etc. Specifically, the circulating component can be circulating pipes of tubular heater (such as shell-free type or shell and tube type), coil heater, serpentuator heater, the circulating component can be inner sleeves of the sheath tube heater, the circulating component can also be spiral passage of the spiral plate heater. The heat source can be any heat sources that can heat the fluid in the circulating component, for example, the circulating component can be heated from the outside, such as high-temperature flue gas, fused salt, steam, electric heating components etc., in which the high-temperature flue gas is preferably selected from high-temperature flue gas in the furnace or the flue; the steam is selected from boiler, steam pipe network or discharged steam. The purpose of heating can be realized by arranging the circulating component on the high-temperature flue gas, fused salt and steam, or arranging the electric heating component around the circulating component, for example, covering the coat of the sheath tube heater and the outer wall of the serpentuator heater with a layer of electric heating rod or heater strip. The circulating component can also be heated from inside, for example, the electric heated tube that is arranged inside of the circulating component or the steam that can be transported to the inside of the circulating component. A preferable embodiment of the heater is a tubular heater or a coil heater or a serpentuator heater exposed in the high-temperature flue gas or fused salt. When the steam serves as a heat source, the circulating component is preferably a tubular heater, a sheath tube heater or a spiral plate heater; when the electric heating component serves as a heat source, the circulating component is preferably a sheath tube heater or a serpentuator heater. In the method provided by the present invention for the hydrothermal reaction, the heating method can be: the fluid is made to flow across a circulating component that is selected from a tubular heater, a coil heater, a serpentuator heater, a sheath tube heater or a spiral plate heater, and the fluid is heated by the heat source that is selected from high-temperature flue gas, fused salt, steam or electric heating components. The heater can be configured to make the fluid (such as particulate matters/liquid phase mixture) heated up to a predetermined temperature for once as required, and it can also be configured to make the fluid heated up to a predetermined temperature through multiple heat cycling, thus reducing the heating area of the heater.

In the system provided by the present invention, the reactor includes a container for heat preserving; the method provided by the present invention includes transporting the heated fluid to the heat preserving container to perform hydrothermal reaction. The main function of the container is to provide the fluid with sufficient capacity and enough reaction time. The container body can be a tank, a tubular body or other structures that can contain the fluid of required amount. For example, the container body can be a cylindrical or spherical tank, which can be installed with necessary level display and control component and/or pressure display and control component and/or temperature display component; the tank can also be in communication with the pipe and/or valve for feeding the reagent or the medicament; The bottom of the tank can be in communication with the pipe and/or valve for discharging the material. The container body can be tubulation that is similar to the shell and tube heat exchanger. The heat preserving function of the container can be achieved in various ways. For example, the container is a tank, of which the outer wall is covered with the heat preserving material, or the outer wall of the container is covered with the heat preserving material and has heat source that is capable of heat tracing, such as electric heater tank, or the container is a tubular body that uses hot fluid for heat tracing, for example, flue gas or steam with temperature that is slightly above or equals to the temperature of the hydrothermal reaction fluid are provided around the tubular body of the tubulation of the similar shell and tube heat exchanger. The independent inlet and outlet can be arranged on the container, and the inlet is used for letting the heated fluid enter into the container, and in communication with the circulating component of the heater via pipes; the outlet is used for discharging the reacted fluid out of the container. When the container is a tank, preferably, the inlet of the container is under the outlet of the container in the direction of gravity; more preferably, the inlet of the container is located at the bottom of the tank, the outlet of the container is located at the top of the tank. In the process of hydrothermal reaction, the function of the inlet and the outlet of the container can be transformed as required. For example, the fluid can be made to enter into the tank from the outlet located on the top of the tank, and the fluid can be discharged from the tank from the inlet located at the bottom of the tank; the pipe that communicates with the upper outlet can also be in communication with the branch pipes that is used for feeding the reagent or medicament via pipes; when the fluid in the tank is discharged in the end, the fluid can be discharged through the inlet at the bottom. When the container is a tank, a magnetic stirring component can be arranged inside of the tank, and it can also be arranged without a magnetic stirring component. When no magnetic stirring component is arranged inside of the tank, in order to prevent the particulate matters in the tank from settling, the fluid in the tank can be made to circulate through the pipes communicating with the inlet and the outlet of the tank. In this way, the manufacture cost of the tank can be further reduced.

When the heater of the present invention is configured to reach a predetermined temperature via multiple times of heat cycling, the outlet of the container is in communication with the inlet of the circulating component via pipes, the inlet of the container in communication with the outlet of the circulating component via pipes, and thus forming a circulation loop. In this way, the fluid can be discharged from the container, re-circulating through the heater and being heated by means of cycling heating between the heater and the container. The method provided by the present invention can further include: the fluid is made to circulate through the circulating component for multiple times.

The system provided by the present invention can further include a heat exchanger that in communication with outlet of the container via pipes. The heat exchanger includes a heat exchanger component such as a sheath tube heat exchanger, a spiral plate heat exchanger or a shell and tube heat exchanger, preferably, a sheath tube heat exchanger. The heat exchanger is used for transferring the heat of the fluid that is discharged out of the outlet of the container, i.e. the fluid after the hydrothermal reaction, to other fluid that needs to be heated, for example, fluid that flows before the heater, i.e. the fluid before heating or the water before the reaction. In this way, a certain amount of heat can be saved and the reacted fluid can be cooled down quickly, avoiding the solid-liquid separation of the material during the transportation process, and thus benefiting being discharged directly or being further processed, ensuring the system stay unblocked and stable. The method provided by the present invention can further include: the fluid after the hydrothermal reaction is made to flow across the heat exchanger as noted here.

The system provided by the present invention can further include a mixing apparatus for mixing the reactant and water, the reactant and water are for hydrothermal reaction, the mixing apparatus in communication with the inlet of the circulating component via pipes. In a preferable embodiment, the mixing apparatus includes a stock tank and a stirrer. In a more preferable embodiment, the mixing apparatus includes a stock tank and a stirrer that is capable of cutting up the stock. The reactant, such as incineration fly ash, polluted solid, biomass particulate matters, is mixed with the water or the solution in the stock tank via the stirrer, even with stock cut up to form the fluid, and then transported to the heater, or transported to the heater after flowing through the heat exchanger.

To accomplish the continuous or semi-continuous process of the hydrothermal reaction, the system provided by the present invention can include a plurality of reactors, i.e. two or more reactors, preferably two or three reactors. A plurality of reactors are installed in parallel in the system that is provided by the present invention. For example, when the system includes two reactors, the pipe that communicates with the inlets of the two reactor containers and the pipe that communicates with the outlets of the circulating components of the heaters are in communication via branch pipes; the pipe that communicates with the outlets of the two reactor containers are in communication with the pipe that connects the heat exchanger via branch pipes. The method provided by the present invention can further include: transporting the heated fluid to a plurality of the containers respectively.

In the system provided by the present invention, corresponding pumps and/or valve are installed in the pipes as required. That is to say, one or more working pumps capable of driving the fluid to circulate in the whole pipes can be installed in the system provided by the present invention. The valves that are capable of controlling the independent opening and closing of the pipes of each apparatus can also be installed in the system provided by the present invention.

Compared with the batch processing reactor adopting the large-scale dividing wall type heating surface, the present invention adopts a tubular heater, or a spiral plate heater, or sheath tube heater, and adopts the pumping way to make the fluid that contains the particulate matters flow (such as the mixed materials of fly ash and water) to be mixed completely without the need of stirring. The fluid containing particulate matters circulates while being heated in the pipe or in the spiral plate, avoiding the sealing design as required by the stirring apparatus, avoiding the maintenance difficulties due to the possible scale formation on the wall of the salt precipitation. Especially, when compared with the volume type reaction tank, the pressure bearing capability is greatly improved in terms of the tube heating surface or the spiral plate heating surface. However, the heat preserving container with larger volume in the system does not play the role of heating, and the continuous turnover and circulating of the material avoids the need that the stirrer must stir the material evenly, therefore the reliability of the whole pressure system is greatly enhanced.

BRIEF DESCRIPTION OF THE DRAWINGS

FIG. 5 shows an embodiment of a heat preserving container of the present invention; in which,
FIG. 5A shows the circulation of the hot fluid for heat tracing, the circulating way of the hot fluid is shown by the arrows;
FIG. 5B is a cross-sectional view of the container, the circulating way of the fluid of the hydrothermal reaction being shown by the arrows;
FIG. 5C shows the connecting method of the tubulation, the circulating way of the fluid of the hydrothermal reaction being shown by the arrows.

DETAILED DESCRIPTION OF THE PREFERRED EMBODIMENTS

Figure 1:
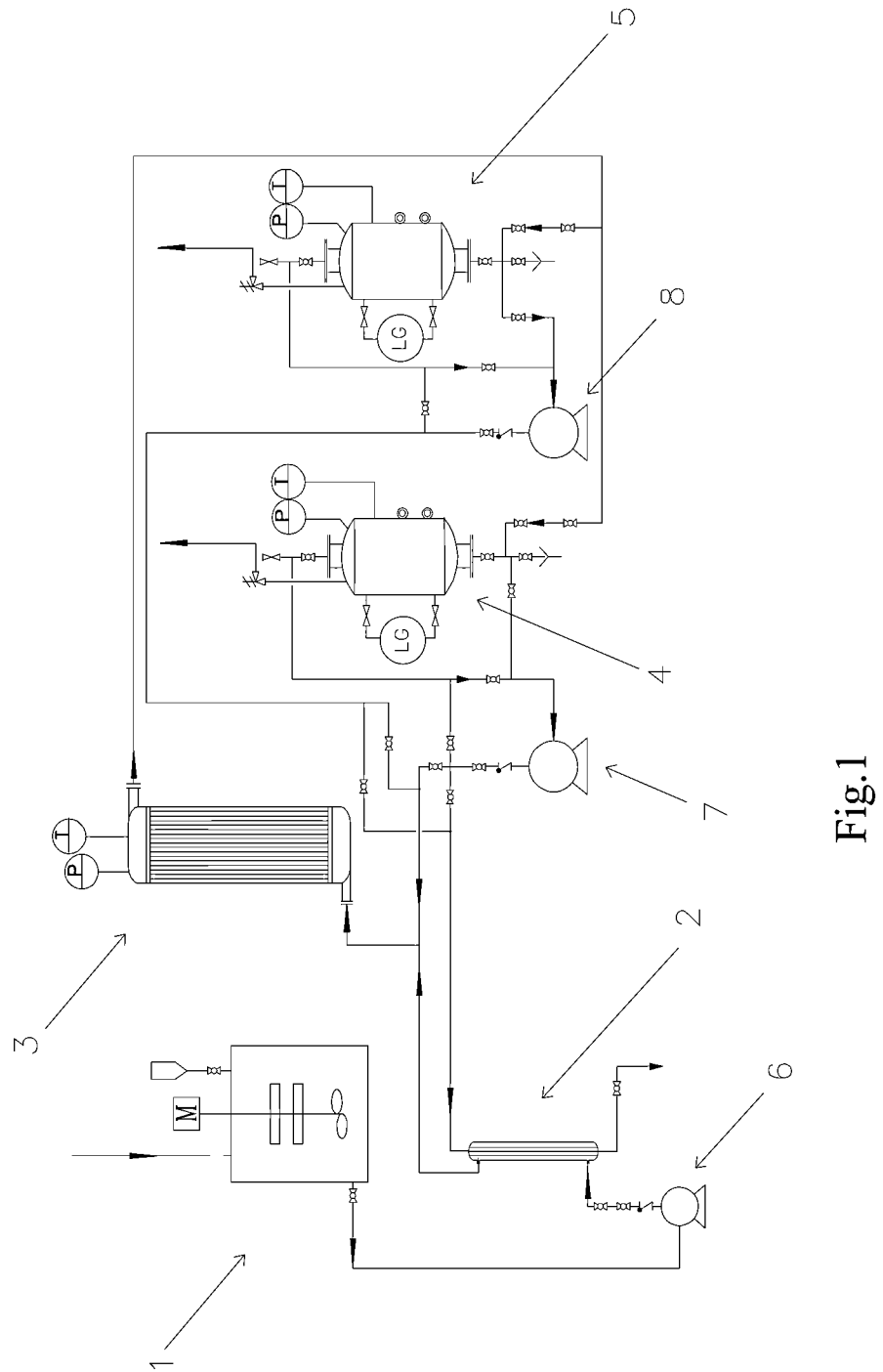
FIG. 1 shows the first embodiment of the system provided by the present invention.

FIG. 1 shows a specific embodiment of the system provided by the present invention. As shown in FIG. 1, the system of the specific embodiment includes a mixing apparatus 1, a heat exchanger 2, a heater 3, a first reactor 4, a second reactor 5, in which the mixing apparatus 1 includes a stock tank, a stirrer and a material feeder; the heater 3 is a tubular heater; the heat exchanger 2 is a heat exchanger; the first reactor 4 includes a first heat preserving container; the second reactor 5 includes a second heat preserving container, the first heat preserving container and the second heat preserving container are cylindrical tanks, of which the outer walls are covered with the heat preserving material, and which have a first heat tracing apparatus and a second heat tracing apparatus arranged thereon, respectively. Independent inlets and outlets are arranged on the first heat preserving container and the second heat preserving container, respectively. The inlet is at the bottom of the tank, and the outlet is on the top of the tank. The outlet is in communication with the pipe and the valve that are for feeding the reagent or the medicament. The system in the specific embodiment further includes the feeding pump 6, the first circulating pump 7, and the second circulating pump 8.

In the system of this specific embodiment, by arranging the corresponding pipe connection and the valve, the fluid can circulates as follows:

The first course of the fluid: The mixing apparatus→the feeding pump→the heat exchanger→the heater→the inlet of the first reactor→maintain temperature in the first reactor for an expected time→the outlet of first reactor→the first circulating pump→the heat exchanger→discharge The second course of the fluid: The mixing apparatus→the feeding pump→the heat exchanger→the heater→the inlet of the second reactor→maintain temperature in the second reactor for an expected time→the outlet of second reactor→the second circulating pump→the heat exchanger→discharge The third course of the fluid: The mixing apparatus→the feeding pump→the heat exchanger→the heater→the inlet of the first reactor→the fluid reaches an expected volume in the first reactor→the outlet of the first reactor→the first circulating pump→the heater→cycling heating between the heater and the first circulating pump to an expected temperature and time→the inlet of the first reactor→the outlet of the first reactor→the first circulating pump→the heat exchanger→discharge The fourth course of the fluid: The mixing apparatus→the feeding pump→the heat exchanger→the heater→the inlet of the second reactor→the fluid reaches an expected volume in the second reactor→the outlet of the second reactor→the second circulating pump→the heater→cycling heating between the heater and the second circulating pump to an expected temperature and time→the inlet of the second reactor→the outlet of the second reactor→the second circulating pump→the heat exchanger→discharge The fifth course of the fluid: The mixing apparatus→the feeding pump→the heat exchanger→the heater→the inlet of the first reactor→the outlet of the first reactor→the first circulating pump→the heater→cycling heating between the heater and the first reactor to a predetermined temperature→the inlet of the first reactor→the first circulating pump→the outlet of the first reactor→the first reactor→the fluid circulates between the pipe and the first reactor to a predetermined time under the function of the first circulating pump→the inlet of the first reactor→the heat exchanger→discharge The sixth course of the fluid: The mixing apparatus→the feeding pump→the heat exchanger→the heater→the inlet of the second reactor→the outlet of the second reactor→the second circulating pump→the heater→cycling heating between the heater and the second reactor to a predetermined temperature→the inlet of the second reactor→the second circulating pump→the outlet of the second reactor→the second reactor→the fluid circulates between the pipe and the second reactor to a predetermined time under the function of the second circulating pump→the inlet of the second reactor→the heat exchanger→discharge The seventh course of the fluid: The inlet of the first reactor→the heat exchanger→discharge The eighth course of the fluid: The inlet of the second reactor→the heat exchanger→discharge Wherein:

(1) The characteristic of the first and the second course is that the fluid being heated once to the expected temperature and performing the hydrothermal reaction in the container, to prevent the particulate matters in the container from settling, a magnetic stirring component can be arranged inside of the tank. The combining use of the first and the second courses can realize the continuity and semi-continuity of the hydrothermal reaction.

(2) The characteristic of the third and the fourth course is that the fluid being cycling heated to the expected temperature, while the hydrothermal reaction is performed, the fluid in the container is still in circulation, so as to prevent the particulate matters in the container from settling, when the heat source of the heater is flue gas with high-temperature, it can also prevent the heater from burning due to the high temperature. The combining use of the third and the fourth courses can realize the continuity and semi-continuity of the hydrothermal reaction. In this course, the heat tracing apparatus does not need to work.

(3) The characteristic of the fifth and the sixth course is that the fluid being cycling heated to the expected temperature, while the hydrothermal reaction is performed, the fluid in the container is still in circulation, and the circulating fluid runs through in sequence from the outlet that is located on the top of the tank, interior of the tank, the outlet that is located on the top of the tank, the circulating pump, and then the outlet that is on the top of the tank, without circulating through the heater, in order to prevent the particulate matters in the container from settling; when the heat source of the heater is electric heating component and steam, the electric heating component and the steam can stop working. The combining use of the fifth and the sixth courses can realize the continuity and semi-continuity of the hydrothermal reaction.

(4) The characteristic of the seventh and the eighth course is that they can make the fluid in the tank being discharged more sufficiently, the seventh course can be combined to the first or the fifth course; the eighth course can be combined to the second or the sixth course.

(5) Any one of the first, third and fifth course can be combined to any one of the second, fourth and sixth course and realize the continuity and semi-continuity of the hydrothermal reaction.

(6) The course of the fluid in the system provided by the present invention can include all the aforementioned situations but not limited to the aforementioned situation.

Here, the first circulating pump and the second circulating pump have the function same as the discharging pump. Two reactors are arranged at the same time so as to realize the continuity or semi-continuity of the hydrothermal reaction. Wherein, the valve adopted is preferably electric gate valve or electric check valve; the circulating pump is preferably screw type slurry pump or wear resistant and high temperature resistant slurry pump.

Figure 2:
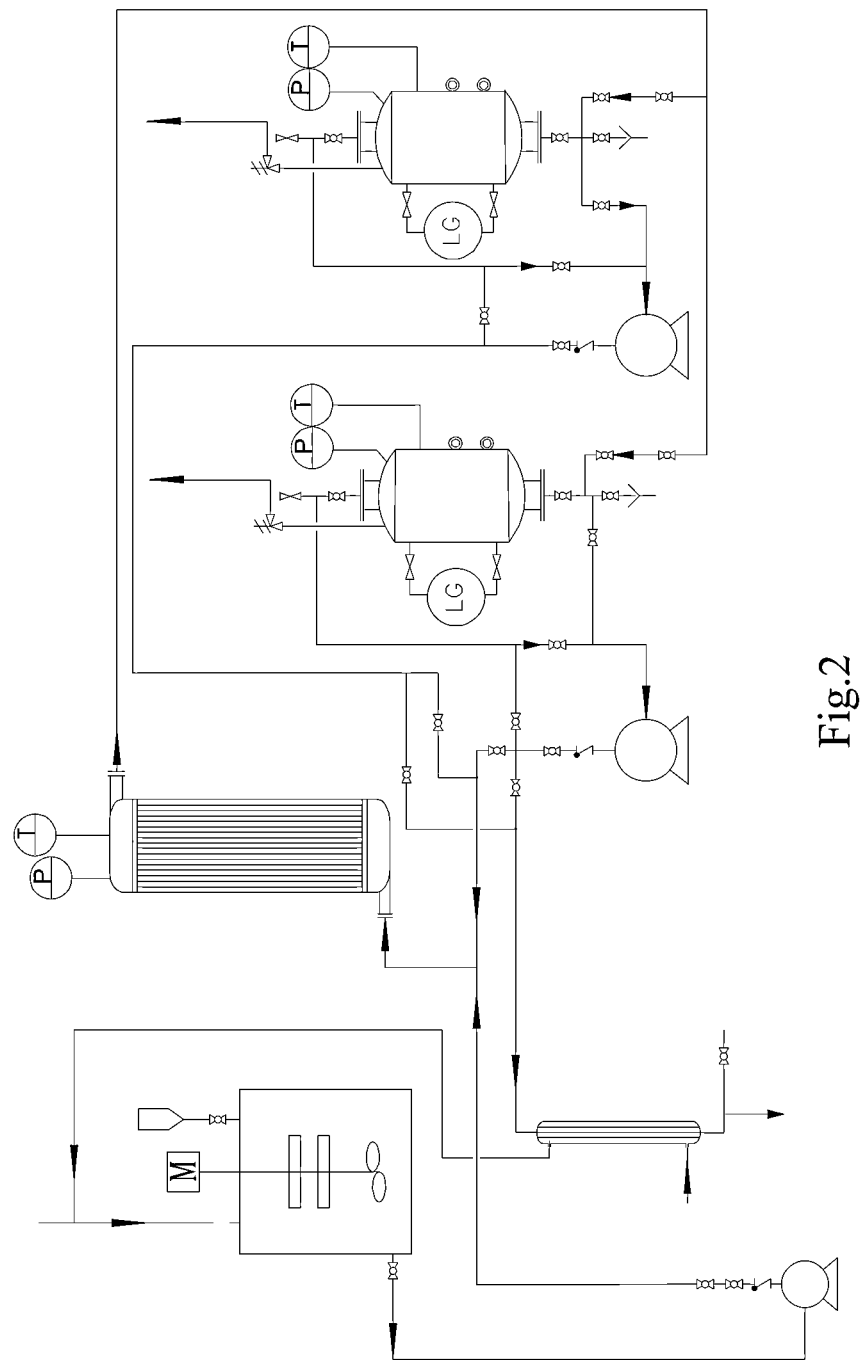
FIG. 2 shows the second embodiment of the system provided by the present invention.

FIG. 2 shows a specific embodiment of the system provided by the present invention. As shown in FIG. 2, different from the system as shown in FIG. 1, in the present embodiment, the heat exchanger of the system is not arranged between the mixing apparatus and the heater, rather, it is arranged at the upstream of the mixing apparatus, and in this way, the heat exchanger can be used to heat the water before mixing.

Figure 3:
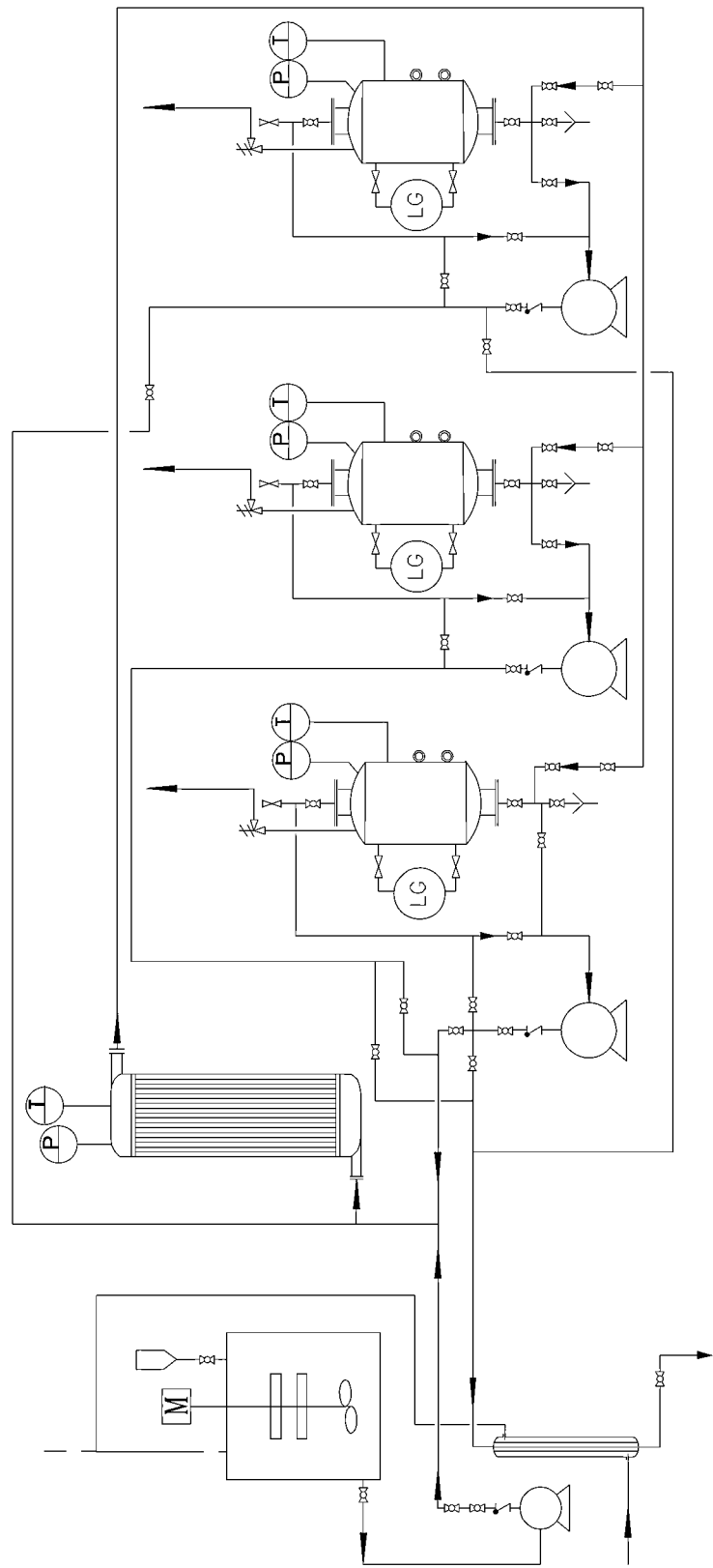
FIG. 3 shows the second embodiment of the system provided by the present invention.

FIG. 3 shows a specific embodiment of the system provided by the present invention. As shown in FIG. 3, different from the system in FIG. 2, the system of the present embodiment includes three reactors.

Figure 4:
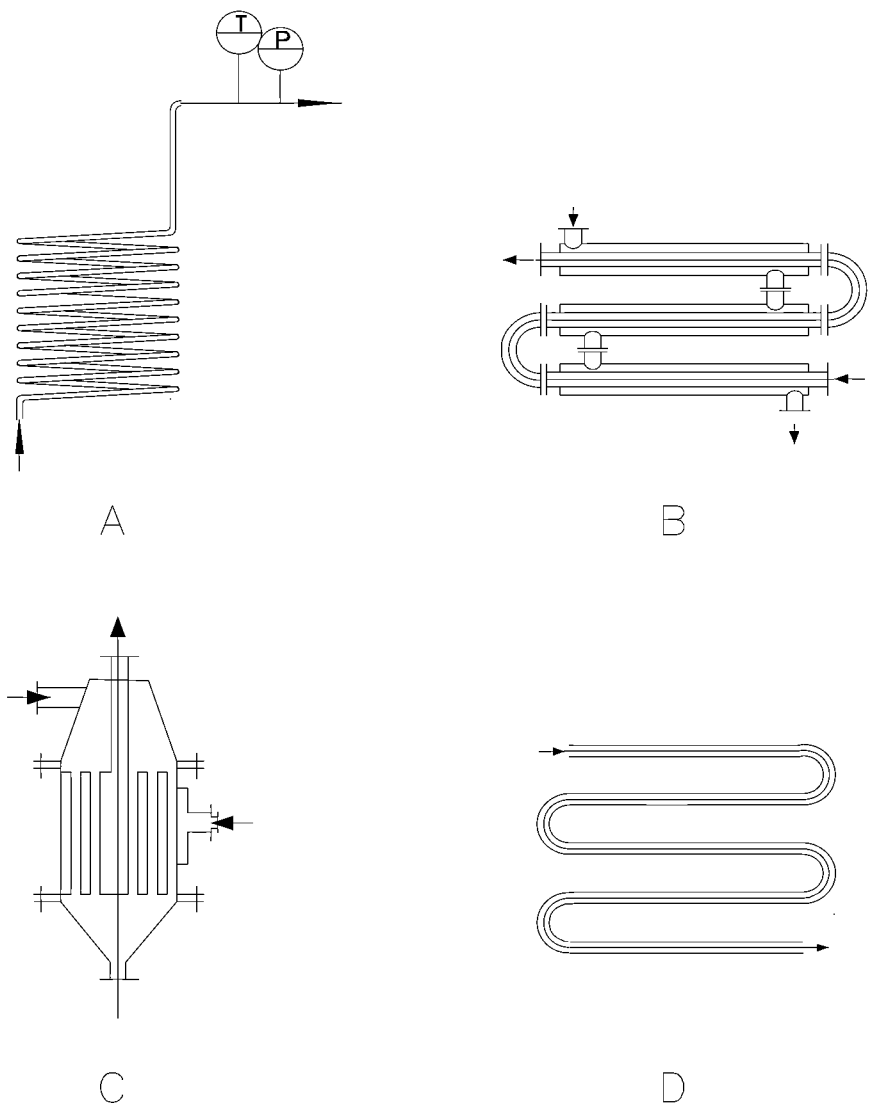
FIG. 4 shows other four embodiments of the heater of the present invention besides the tubular heater.

FIG. 4 shows another four specific embodiments of the heater in the present invention. Besides the embodiment of the tubular heater as shown in FIG. 1-3, the heater of the present invention can also adopt the embodiment of FIG. 4. As shown in FIG. 4A, the circulating component is a coil heater, and the heat source is high-temperature flue gas, fused salt, steam or electric heating component; as shown in FIG. 4B, the circulating component is a sheath tube heater (for performing the fluid of the hydrothermal reaction circulating in the inner sleeve), and the heat source is a hot fluid that is circulating in the outer sleeve, and the hot fluid is flue gas or steam of high-temperature, or an electric heating component that is arranged on the outer sleeve. As shown in FIG. 4C, the circulating component is a spiral passage of spiral plate heater; the heat source is a hot fluid in another spiral passage, and the hot fluid is flue gas or steam of high-temperature; as shown in FIG. 4D, the circulating component is a serpentuator heater, and the heat source is high-temperature flue gas, fused salt, steam or electric heating component.

Figure 5:
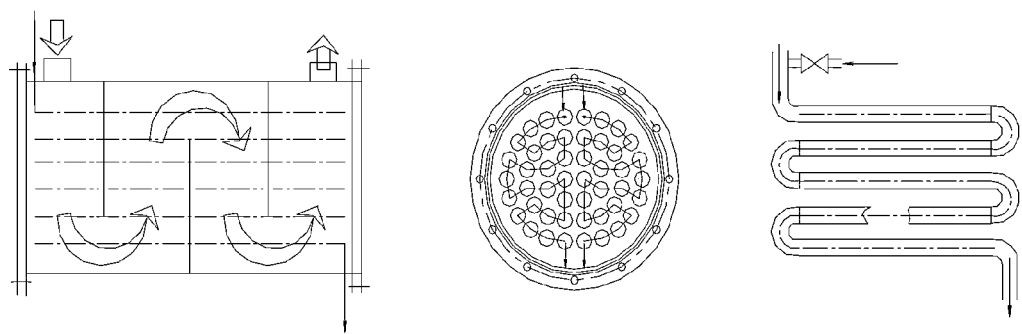

FIG. 5 shows a specific embodiment of the system provided by the present invention. Except for the heat preserving container as shown in FIG. 1, i.e. a tank form, the container of the present invention can adopts a tubular body form. As shown in FIG. 5, the container that is similar to the shell and tube heat exchanger, the tubulation of the heat exchanger is for storing and circulating the fluid of the hydrothermal reaction; the shell of the heat exchanger is a cylindrical thin shell, different from the shell of the regular shell and tube heat exchanger, it is not pressure bearing, the hot fluid that is capable of heat tracing is circulating inside, for example, the flue gas or stream with temperature that is slightly above or equals to the fluid of the hydrothermal reaction. The heat preserving container can be configured to store the total volume of the reacted fluid that runs through the heater in 5 to 30 minutes. Similar to the tank container, the tubular container is also in communication with the branch pipe and the valve that are used for feeding the reagent and medicament, so as to feed in the medicament as required.

Referencing now to the specific embodiments and the technical schemes and induced technical effect of the present invention would be expounded.

Embodiment 1

The present embodiment adopts the system as shown in FIG. 2, in which the heater is changed to a serpentuator heater.

The fly ash generated by a 1000 t/d waste incineration plant contains dioxin, heavy metal and high salt concentration, especially Cl ion. When processed with technique of the present invention, it is firstly washed by clean water, separating the stones and sediments, and then the washed fly ash enters into the stock tank through the material feeder. The water that is used for making the grout is preheated by the heat exchanger and then transported to the stock tank, becoming the grout after mixing with the fly ash. The heat source of the heat exchanger is the material of the heat preserving container. Similar to the solube ferrite and ferric salt in the solid form pass through the material feeder and then into the stock tank, starting the stirrer and stirring even as disclosed in the PCT/CN2011/073562. The grout is transported to the heater by the feeding pump; the heater is a serpentuator heater placed in the 550 to 650° C. temperature zone of the flue in the incinerator, formed by bending the corrosion-resistant stainless steel such as 2205 duplex stainless steel of $\Phi45*3$, the length of the single row tube is 30 m, 5 rows in total, the distributing header is at the inlet, and the collecting header is at the outlet. The flow velocity of the grout is around 0.5 m/s (the starting flow velocity is above 0.80 m/s) in the pipe, transported from the outlet header to the first heat preserving container; feeded in through the bottom of the first heat preserving container, until it reaches a predetermined level, the first circulating pump that is connected to the first heat preserving container opens up, the material begins to circulate between the heater and the first heat preserving container, until the liquid level reaches to the upper limit; at this time, the feeding pump stops feeding, and only the circulating pump is working, making the material circulate between the heater and the first heat preserving container, all the material reaches to the predetermined temperature of 260° C. to 293° C. after circulating for 5 times. After this, keep the circulation until the material reaches the predetermined temperature (during this process, the heat tracing apparatus does not need to work), for example, after keeping the predetermined temperature for 30 to 60 minutes, the material is discharged into the heat exchanger, at the same time, the feeding pump starts material feeding, and then transported to the second heat preserving container through heater, circulating between the second heat preserving container and the heater, until the reaction is completed. The working volume of the first heat preserving container and the second heat preserving container is both 5 m3. The discharged material is cooling down as the pressure is dropping down in the heat exchanger, for the discharged material, the concentration of dioxin in the processed fly ash decreases by 90% or above (toxicity equivalent), transported to the next step or the processing procedure. The advantage of the present system is that the heater only needs a few heating area; and the heat preserving container can be made of normal stainless steel even carbon steel and the safety is still guaranteed.

Embodiment 2

The present embodiment adopts the system in FIG. 2.

A medical waste incinerator fly ash disposal station is established between two cities, for processing the medical waste incineration fly ash totals about 2.8 to 3 t/d that is generated by the two cities. The medical waste incineration fly ash includes dioxin, heavy metal and high salt concentration, especially Cl—, when processed with the technology of the present invention, the fly ash together with any of the solube ferrite and ferric salt disclosed in the PCT/CN2011/073562, preferably ferric salt, are mixed according to measurement and then pass through the material feeder and enters into the stock tank. The water for making the grout runs through the heat exchanger and transported to the stock tank after being preheated; the heat source of the heat exchanger is the material of the heat preserving container. Start the stirrer and stir the water and the fly ash to be mixed into grout, and then add another kind of ferrite solution, after stirring evenly, these are transported to the heater by the feeding pump; the heater is a coil heater placed in the fused salt with the temperature of 450° C. (as shown in FIG. 4A), it is formed by bending the corrosion resistance of stainless steel pipe of $\Phi38*3.5$ such as 254SMO, the length of the pipe is 30 meters, in and out through a single tube. The fly ash/water mixture i.e. the material is heated and transported to the first heat preserving container; feeded in through the bottom of the first heat preserving container, until it reaches a predetermined level, the first circulating pump that is connected to the first heat preserving container opens up, the material begins to circulate between the heater and the first heat preserving container, until the liquid level reaches to the upper limit; at this time, stop the feeding pump, only the circulating pump is working, the material circulate between the first heat preserving container and the heater; all the material on average circulates 2.36 times and heated to the temperature of 292° C., preserve the heat for 30 to 60 minutes (the heat tracing apparatus does need to work during the process), and then the material is discharged, transported to the heat exchanger, the pressure of the material drops down as it is cooling down, the processed fly ash is transported to the next step to use or process. At the same time the feeding pump opens, the material is transported to the heater and then to the second heat preserving container, the aforementioned process is repeated. The working volume of the first heat preserving container and the second heat preserving container is both 1.0 m3. The present reaction system uses 254SMO pipe together with two 316 or 316L stainless steel heat preserving container, conveniently and economically solves the problem of the medical waste incineration fly ash in the two big cities.

Embodiment 3

The present embodiment adopts the system in FIG. 3. The volume of the first heat preserving container, the second heat preserving container and the heat preserving container is all 5 m³, which is the same as the system adopted by the first embodiment.

The fly ash generated by a 1500 t/d waste incineration plant contains dioxin, heavy metal and high salt concentration, especially Cl ion.

When the first heat preserving container preserve the heat after reaching to the predetermined temperature in order to keep the temperature for a given reaction time such as 60 min, close the first feedstock loop, the first circulation loop and the first discharging loop; at this time, start the feeding pump and feed the material to the heater, and then to the second heat preserving container, after that, the material is circulating between the second heat preserving container and the heater; when the second heat preserving container reaches to the predetermined reaction time and discharges materials, start the feeding pump, the material enters into the third heat preserving container through the heater. Comparing the present embodiment to other embodiments, when keeping the reaction time of an heat preserving container without procrastinating the stock feeding and circulating of the heat preserving container, therefore, without changing the condition, by only adding a heat preserving container and a corresponding circulating pump and valve system, the processing volume of the reacted fluid would increase by 50%.

Embodiment 4

The present embodiment adopts the system in FIG. 1.

The moisture content of the sludge discharged by a sewage disposal plant is 80 to 93%, transported to the stock tank from the material feeder; the material feeder has the function of filtering the stones at the mean time. After start the stirrer and stirring evenly, it is transported to the heat exchanger by the feeding pump; the heat source of the heat exchanger is from the material of the heat preserving container. The material is transported to the heater after preheating; the heater is a spiral plate type (as shown in FIG. 4C), stainless steel, such as 304L, 316 or 316L. Heated by the steam with the temperature of 180° C. with the steam going through the up-down passage, the sludge enters into the spiral passage, heated up to the temperature of 165 to 170° C. and then transported to the first heat preserving container; feed in through the bottom of the first heat preserving container, until it reaches a predetermined level, the first circulating pump that is connected to the first heat preserving container opens up, the material begins to circulate between the heater and the first heat preserving container, until the liquid level reaches to the upper limit; at this time, turn off the feeding pump, making the material circulate between the heater and the first heat preserving container, and then begins to discharge the material after 10 minutes' circulation; the sludge is transported to the heat exchanger for cooling and then enters into the next liquid-solid separation apparatus. At the same time, start the feeding pump, the material is from the heat exchanger to the heater, transported to the second heat preserving container, when the second heat preserving container reaches to the predetermined upper limit of the material level, start the circulating and discharging procedure that is the same as the first heat preserving container. The first heat preserving container and the second heat preserving container have heat preservation on the outside together with heat tracing apparatus, the heat tracing apparatus is an electric heater of 2 KW, starting only when the temperature of the material is under 165° C. If the system adopts the system that includes three reactors as shown in FIG. 3, the continuity of the hydrothermal processing of the sludge discharged by the sewage disposal plant can be achieved.

Embodiment 5

The present embodiment adopts the system as shown in FIG. 1, yet the heat preserving container is changed into a tubular body that uses the fluid for heat tracing as shown in FIG. 5.

The moisture content of the sludge discharged by a sewage disposal plant is 80 to 93%, transported to the stock tank from the material feeder; the material feeder has the function of filtering the stones at the mean time. After start the stirrer and stirring evenly, it is transported to the heat exchanger by the feeding pump; the heat source of the heat exchanger is the reacted the fluid from the heat preserving container. The unreacted material fluid is preheated and then transported to the heater; the heater is a sheath tube type (as shown in FIG. 4B), made of stainless steel such as 304L, 316 or 316L. Heated by the steam with temperature of 6 MPa with the steam going through the passage outside the tube, the unreacted material runs through the passage inside of the tube, heated up to the temperature of 265 to 270° C. and then transported to the first heat preserving container; the first heat preserving container is a tubular body that is similar to the shell and tube the heat exchanger (as shown in FIG. 5), the tubes are connected via elbows. The flow velocity in the tubulation of the first heat preserving container is 0.05 m/s; the reaction material flowing out of the last section of pipe of the first heat preserving container is connected to the first circulating pump, under the function of the first circulating pump, the fluid is circulating between the pipes and the first heat preserving container, and conditioner of the sludge hydrothermal treatment can be added into the circulating process, until it reaches to a predetermined time for heat preserving, at the same time, the second heat preserving container is performed the feeding and discharging operations. When inside of the first heat preserving container for a predetermined time and start the feeding pump and the corresponding pipes, the feeding material and the discharging material from the first heat preserving container exchange heat in the heat exchanger and still transported to the first heat preserving container, the next round of heating and heat preserving begins. The work of the second heat preserving container is similar to the first heat preserving container, the feeding and discharging the material alternatively, and realizing the continuous operations. The reacted material coming from the heat exchanger is charry sludge fluid, it enters into the next liquid-solid separation process and then being recycled, in this process, under the function of the conditioner, the heavy metal in the sludge can be partially removed or stabilized. The fluid for heat tracing and heat preserving in the heat preserving container is hot smoke with the temperature of 300° C. or hot steam with temperature above 280° C.

Embodiment 6

The present embodiment adopts the system in FIG. 1.

The moisture content of the food waste in a food waste disposal plant is 80 to 85%, transported to the stock tank from the material feeder; the bones, hard thorns and stones are filtered by filter unit of the material feeder. Start the stirrer with blade and cutting function and stirring evenly, and then transported to the heat exchanger from the feeding pump for preheating; the suction mouth of the feeding pump is in the middle-lower part of the stock tank; the bottom of the stock tank is taper shaped so as to collect silver sand. The heat source of the heat exchanger is from the material of the heat preserving container. The material is transported to the heater after preheating; the heater is a serpentine tube type heater (as shown in FIG. 4D), which is formed by bending the corrosion resistance of stainless steel pipe such as 254SMO pipe of Φ45*2.5 standard, the external portion is firstly heated by the steam, until the material is heated up to 200° C., the last section adopts the electric heating to make the food waste material being heated up to the temperature of 280° C., transported to the first heat preserving container; feed in through the bottom of the first heat preserving container, until it reaches a predetermined level, the first circulating pump that is connected to the first heat preserving container opens up, the material begins to circulate between the heater and the first heat preserving container, until the liquid level reaches to the upper limit; at this time, stop feeding the material, after heat preserving for 20 to 30 minutes; open the corresponding pipe, and the first circulating pump changes to a discharging pump; the material is transported to the heat exchanger; at the same time, open the feeding pump, after being preheated by the heat exchanger and then transported to the heater, and finally transported to the second heat preserving container, when the second heat preserving container reaches the predetermined material level, repeat the circulating procedure that is similar to the first heat preserving container. The vent valves on the top of the first heat preserving container and the second heat preserving container open at regularly to emit the gas that is generated during the process, the material that is discharged from the heat exchanger is transported to the next apparatus waiting for being further processed.

The reaction system in the present invention is adopted to realize the decomposition process of the persistent organic pollutant and separation process of the heavy metal in the particulate matters, and also to realize the hydrothermal reaction of organic food waste and hydrothermal process of the sludge and partial separation of heavy metal. The reaction process is safe, avoiding the potential safety hazard of scale formation and corruption due to the dividing wall type heating surface and the leaking problem that might occur in the stirring process in the large-scale and high pressure space.

The invention claimed is:

1. A system for hydrothermal reaction, wherein the system comprises:
a heater comprising a circulating component for fluid flowing across and a heat source for heating the fluid, wherein the heater is used for making the fluid be heated up to the temperature required by the hydrothermal reaction; and
a reactor comprising a container for preserving heat, the container is in communication with the circulating component via pipes, wherein the reactor is not heated; wherein the system further includes a mixing apparatus for mixing reactant and water, the reactant and water used for the hydrothermal reaction, the mixing apparatus and an inlet of the circulating component are in communication via pipes.

2. The system as defined in claim 1, wherein the fluid contains reactant and water for the hydrothermal reaction.

3. The system as defined in claim 1, wherein the circulating component is selected from a tubular heater, a coil heater, a serpentuator heater, a sheath tube heater or a spiral plate heater.

4. The system as defined in claim 1, wherein the heat source is selected from high-temperature flue gas, fused salt, steam or electric heating components.

5. The system as defined in claim 1, wherein the container is a tank covered with heat preserving material on the outer wall of the tank.

6. The system as defined in claim 1, wherein the container is a tubular body using hot fluid to perform heat tracing.

7. The system as defined in claim 1, wherein, an independent inlet and outlet are arranged on the container, the inlet and the outlet are in communication via pipes therebetween.

8. The system as defined in claim 1, wherein independent inlet and outlet are arranged on the container, the inlet is located under the outlet in the direction of gravity.

9. The system as defined in claim 1, wherein an independent inlet and outlet are arranged on the container, the outlet of the container and the inlet of the circulating component are in communication via pipes, the inlet of the container and the outlet of the circulating component are in communication via pipes.

10. The system as defined in claim 1, wherein, the system further includes a heat exchanger communicating with the outlet of the container via pipes.

11. The system as defined in claim 10, wherein the heat exchanger includes a heat exchanger component selected from a sheath tube heat exchanger, a spiral plate heat exchanger or a shell and tube heat exchanger.

12. The system as defined in claim 1, wherein a number of the reactors is plural, and the plurality of the reactors are mounted in the system in a parallel way.

13. The system as defined in claim 12, wherein the number of the reactors is two or three.

14. A method for hydrothermal reaction, wherein the method comprising:
heating fluid that includes reactant and water to a temperature required for the hydrothermal reaction by circulating fluid across a heat source using a circulating component;
transporting the heated fluid to a container of a reactor for preserving heat to perform the hydrothermal reaction, wherein the container is in communication with the circulating component via pipes and the reactor is not heated; and
mixing reactant and water used for the hydrothermal reaction using a mixing apparatus, the mixing apparatus and inlet of the circulating component in communication via pipes.

15. The method as defined in claim 14, wherein the heating comprises a heating method for reactant and water flow for hydrothermal reaction, the heating method being: the fluid being made to flow across a circulating component selected from a tubular heater, a coil heater, a serpentuator heater, a sheath tube heater or spiral plate heater, and being heated by a heat source selected from high-temperature flue gas, fused salt, steam or electric heating components.

16. The method as defined in claim 15, wherein the method of heating is: causing the fluid to circulate through the circulating component for one or more times.

17. The method as defined in claim 14, wherein the method further comprising: the fluid after the hydrothermal reaction flowing across the heat exchanger.

18. The method as defined in claim 14, wherein there is provided a plurality of the containers, the method further comprising: transporting the heated fluid to a plurality of the containers respectively.

* * * * *